United States Patent
Pan et al.

(10) Patent No.: US 12,498,265 B2
(45) Date of Patent: Dec. 16, 2025

(54) INTEGRATING SPHERE PHOTOMETER SPECTRAL RESPONSE MEASUREMENT METHOD AND SYSTEM

(71) Applicant: HANGZHOU EVERFINE PHOTO-E-INFO CO., LTD., Zhejiang (CN)

(72) Inventors: Jiangen Pan, Zhejiang (CN); Yan Huang, Zhejiang (CN); Zhijiang Mao, Zhejiang (CN); Qian Li, Zhejiang (CN)

(73) Assignee: HANGZHOU EVERFINE PHOTO-E-INFO CO., LTD., Zhejiang (CN)

( * ) Notice: Subject to any disclaimer, the term of this patent is extended or adjusted under 35 U.S.C. 154(b) by 388 days.

(21) Appl. No.: 18/249,739

(22) PCT Filed: Sep. 17, 2020

(86) PCT No.: PCT/CN2020/115829
§ 371 (c)(1),
(2) Date: Apr. 20, 2023

(87) PCT Pub. No.: WO2021/208349
PCT Pub. Date: Oct. 21, 2021

(65) Prior Publication Data
US 2023/0408330 A1  Dec. 21, 2023

(30) Foreign Application Priority Data

Apr. 14, 2020 (CN) .......................... 202010288898.2
Apr. 14, 2020 (CN) .......................... 202020542118.8

(51) Int. Cl.
*G01J 1/44* (2006.01)
*G01J 1/04* (2006.01)
(Continued)

(52) U.S. Cl.
CPC .............. *G01J 1/44* (2013.01); *G01J 1/0474* (2013.01); *G01J 1/08* (2013.01);
(Continued)

(58) Field of Classification Search
CPC .... G01J 1/44; G01J 1/0474; G01J 1/08; G01J 2001/0481; G01J 3/0254; G01J 3/28; G01M 11/02
See application file for complete search history.

(56) References Cited

U.S. PATENT DOCUMENTS 5,359,406 A * 10/1994 Suzuki .................. G01J 1/42
250/228
9,958,317 B1 * 5/2018 Zong .................... G01J 1/4228
2013/0099102 A1 * 4/2013 Park ......................... G01J 1/42
250/208.2

FOREIGN PATENT DOCUMENTS

CN        2718553 Y  *  8/2005  ............ G01M 11/00
CN      101650225 A  *  2/2010  ................ G01J 5/60
(Continued)

*Primary Examiner* — Tarifur R Chowdhury
*Assistant Examiner* — Kaitlyn E Kidwell
(74) *Attorney, Agent, or Firm* — PROI Intellectual US

(57) ABSTRACT

An integrating sphere photometer spectral response measurement system has an integrating sphere photometer and three or more reference light sources having different peak wavelengths. The integrating sphere photometer has an integrating sphere and a broadband photodetector, wherein the broadband photodetector is mounted on a sphere wall of the integrating sphere. Emergent light of the reference light sources is incident to the integrating sphere. The total spectral radiation flux $Pi(\lambda)(i=1, 2, \ldots n)$ received by an integrating sphere photometer system is acquired; the response $Mi(i=1, 2, \ldots n)$ of a photometer of mixed light in the integrating sphere is read by the broadband photodetector; an equation set is established; and the spectral respon-
(Continued)

sivity Srel($\lambda$) of the integrating sphere photometer is obtained by means of numerical solution.

11 Claims, 3 Drawing Sheets

(51) Int. Cl.
*G01J 1/08* (2006.01)
*G01J 3/02* (2006.01)
*G01J 3/28* (2006.01)
*G01M 11/02* (2006.01)

(52) U.S. Cl.
CPC ..... *G01J 2001/0481* (2013.01); *G01J 3/0254* (2013.01); *G01J 3/28* (2013.01); *G01M 11/02* (2013.01)

(56) References Cited

FOREIGN PATENT DOCUMENTS

| CN | 202599522 U | * | 12/2012 | ................ G01J 1/00 |
| CN | 102175428 B | * | 8/2013 | ............ G01M 11/02 |
| CN | 110749424 A | * | 2/2020 | ................ G01J 3/28 |
| JP | 2008070172 A | * | 3/2008 | ............... G01J 3/443 |
| JP | 5683834 B2 | * | 3/2015 | ................ G01J 1/00 |
| KR | 20110055037 A | * | 5/2011 | ............ G01J 3/0254 |

* cited by examiner

INTEGRATING SPHERE PHOTOMETER SPECTRAL RESPONSE MEASUREMENT METHOD AND SYSTEM

TECHNICAL FIELD

The invention relates to the field of photoelectric testing, in particular to an integrating sphere photometer spectral response measurement method and system.

BACKGROUND ART

Integrating sphere spectrometers and integrating sphere photometers are commonly used photometric measurement devices, among which integrating sphere photometers have unique application advantages in the field of low light measurement because of high sensitivity and large linear dynamic range, and are especially suitable for measuring low light products such as micro LEDs and MiniLEDs.

When integrating sphere photometers are used for measuring photometric values, spectral mismatch errors often occur, especially for the measurement of narrow-band light sources, measurement errors caused by spectral mismatch are serious. Therefore, it is necessary to evaluate and correct spectral mismatch errors of an integrating sphere photometer system, which is also recommended by CIE documents and related TCs. Spectral mismatch error evaluation and correction must be based on the comprehensive spectral responsivity of the whole measurement system. For the integrating sphere photometer system, the spectral responsivity of the whole system including an integrating sphere should be considered comprehensively, instead of only considering the photometer itself, which is also required by CIE and other related technical documents. However, there is no good method for its measurement at present.

In methods commonly used for measuring the spectral responsivity of detectors, spectral comparison devices based on tunable lasers or lamp-monochromator systems are adopted, such as the SIRCUS system and SCF system by NIST. By generating a monochromatic light source with a narrow bandwidth and comparing the readings of the detected detector with those of a reference detector, the spectral responsivity of the detected detector can be obtained. Such methods have high requirements for the laboratory environment and equipment, and are not suitable for industrial application due to high economic cost. In addition, if the integrating sphere photometer system is regarded as a whole, when the above spectral comparison devices are adopted, compared with the reference detector with traceable spectral responsivity, the sensitivity of the integrating sphere photometer system may not be high enough, and the complexity of measurement and correction is also increased.

SUMMARY OF THE INVENTION

In view of the shortcomings of the prior art, the invention provides an integrating sphere photometer spectral response measurement method and system, aiming at solving the technical problem of measuring the spectral response of an integrating sphere photometer.

The invention discloses an integrating sphere photometer spectral response measurement method, which involves an integrating sphere photometer consisting of an integrating sphere and a broadband photodetector, wherein the broadband photodetector is mounted on the sphere wall of the integrating sphere. The method is characterized in that the integrating sphere photometer is used for measuring three or more reference light sources with different peak wavelengths, and the spectral responsivity of the integrating sphere photometer is calculated according to the spectral radiation flux of the reference light sources and the response of the integrating sphere photometer to the reference light sources. The method specifically comprises the following steps:

Step a, emergent light of the three or more reference light sources with different peak wavelengths is incident to the integrating sphere, and the response $M_i$(i=1, 2, ... n) of the integrating sphere photometer is read, where n is the number of the reference light sources;

Step b, the spectral radiation flux $P_i(\lambda)$(i=1, 2, ... n) of the reference light sources incident to the integrating sphere is acquired;

Step c, the following equation is established, where $S_{rel}(\lambda)$ is the spectral responsivity of the integrating sphere photometer $$\begin{cases} \int_{\lambda_1}^{\lambda_2} P_1(\lambda) \cdot S_{rel}(\lambda) = M_1 \\ \qquad \vdots \\ \int_{\lambda_{2n-1}}^{\lambda_{2n}} P_n(\lambda) \cdot S_{rel}(\lambda) = M_n \end{cases} ;$$

and

Step d, the spectral responsivity $S_{rel}(\lambda)$ of the integrating sphere photometer is obtained by means of numerical solution.

Specifically, the spectra of the three or more reference light sources with different peak wavelengths overlap, the emergent light of the reference light sources is incident to the integrating sphere, and the broadband photodetector on the integrating sphere is used for obtaining the photometric value $M_i$(i=1, 2, ... n) of mixed light in the integrating sphere, where the response of the broadband photodetector is traceable, and the relative spectral responsivity curve of the broadband photodetector to the detected light of an incident light unit matches the luminous efficiency function curve of human eyes or a flat straight line; and the spectral radiation flux $P_i(\lambda)$(i=1, 2, ... n) of the emergent light of the reference light sources is obtained by other higher-precision system calibration in advance or by subsequent measurement. Each reference light source can obtain a set of photometric value and spectral radiation flux, so the three or more reference light sources with different peak wavelengths can obtain three or more sets of $M_i$, $P_i(\lambda)$(i=1, 2, ... n) (n≥3) values, then the equation is obtained according to the formula, and the spectral responsivity value of the integrating sphere photometer is obtained by numerical calculation, so as to achieve the purpose of analyzing the spectral responsivity of the integrating sphere photometer system.

As a technical scheme, the reference light source is an LED light source, and the LED light source consists of monochromatic LEDs and/or white LEDs with overlapping spectra.

Specifically, the wavelengths of the LED light sources are distributed and cover a specified band range, and the spectra overlap. The spectral radiation flux of the LED light sources can be measured in advance or obtained by arranging a spectrometer on the integrating sphere. When a series of monochromatic LEDs are taken as the light source, the measurement of the spectral responsivity of the integrating sphere photometer system will be affected by the type, number and bandwidth of the LEDs. Within the specified band range, the narrower the bandwidth of the emergent light of the reference light sources is, the more reference light sources within the specified band range are needed because the spectra of the emergent light need to overlap, so more sets of $M_i$ and $P_i$ can be obtained, and the accuracy of the spectral responsivity of the integrating sphere photometer system finally obtained based on the formula is higher.

As a technical scheme, the spectral radiation flux $P_i(\lambda)$ is an absolute value, or the spectral radiation flux $P_i(\lambda)$ is a relative value.

The absolute value refers to the absolute spectral radiation flux, while the relative value is obtained by dividing an absolute spectral responsivity by a constant coefficient. For example, when the light of the reference light sources enters the integrating sphere through a fixed diaphragm, the absolute spectral radiation flux is the product of spectral irradiance and area, so it can be calculated based on the irradiance Ei measured by a traceable radiometer and an entrance aperture area A.

As a technical scheme, the reference light source is a laser device with a characteristic wavelength, or the reference light source consists of two or more laser devices with a characteristic wavelength.

Specifically, the laser spectral power flux $P_i$ is known or measured by a spectrometer. According to the numerical solution formula of the spectral responsivity $S_{rel}(\lambda)$, it can be seen that using lasers as the reference light sources can achieve good results, but the cost is high, and the laser power needs to be adjusted according to the size of the integrating sphere.

As a technical scheme, the incident light of the reference light sources enters the integrating sphere through an incident window on the sphere wall of the integrating sphere, and the incident diaphragm is provided with a calibration detector capable of being connected to and disconnected from an optical path, so as to obtain the radiation flux of the reference light sources.

Specifically, the radiation flux of the reference light sources is obtained by multiplying the radiation illuminance measured by the calibration detector with the area of the incident diaphragm.

Optionally, the size of the incident diaphragm can be adjusted according to test requirements.

As a technical scheme, a measurement window connected with a calibrated spectral radiometer is arranged on the sphere wall of the integrating sphere to obtain the spectral radiation flux of the reference light sources.

As a technical scheme, the reference light source is an adjustable light source with a uniform light-emitting surface, and the light-emitting surface of the reference light source is provided with a detachable spectral radiometer.

The invention also discloses an integrating sphere photometer spectral response measurement system, which comprises an integrating sphere photometer and three or more reference light sources with different peak wavelengths, the integrate sphere photometer consists of an integrating sphere and a broadband photodetector, the broadband photodetector is mounted on a sphere wall of the integrating sphere, an incident window is arranged on the integrating sphere, and the emergent light of the reference light sources is incident to the integrating sphere through the incident window.

Specifically, the three or more reference light sources with different peak wavelengths cover a specified band range, the emergent light of each reference light source is incident to the integrating sphere through an entrance on the integrating sphere, and the broadband photodetector arranged on the sphere wall of the integrating sphere obtains the photometric value $M_i$ of mixed light in the integrating sphere.

As a technical scheme, an incident diaphragm and a calibration detector are also provided, the incident diaphragm is arranged outside the incident window of the integrating sphere, and the calibration detector is arranged on a diaphragm port of the incident diaphragm and capable of being connected to and disconnected from an optical path.

Specifically, the calibration detector can be connected to and disconnected from the optical path, is arranged on the diaphragm port, and can measure the illumination value of the reference light sources. The absolute radiation flux of the reference light sources can be obtained by multiplying the measured illumination value by the area of the incident diaphragm.

As a technical scheme, a spectral measurement window and a spectral radiometer are provided, the spectral measurement window is arranged on the sphere wall of the integrating sphere, and the spectral radiometer is connected with the spectral measurement window.

Specifically, the spectral radiometer is calibrated in advance, and the spectral measurement window is arranged on the sphere wall of the integrating sphere and connected with the spectral radiometer, so as to obtain the spectral radiation flux of the reference light sources.

As a technical scheme, a light diffusion device is arranged in the integrating sphere, and a baffle is arranged in the integrating sphere.

Specifically, when a laser device is used as the light source, a coating of the integrating sphere tends to be damaged by high-power lasers, so it is necessary to properly attenuate the power density of measuring beams to meet the range ability of optical measuring elements. A diffuser can reduce the power density of incident lasers, reduce the influence of the high-power lasers on optical elements on the optical path, improve the accuracy of measurement results by the optical elements, and ensure the response of the integrating sphere without damaging the coating of the integrating sphere.

Specifically, the baffle prevents the measurement device from direct light.

As a technical scheme, an attenuation device is arranged outside the incident window. Specifically, when a laser device is used as the light source, a coating of the integrating sphere tends to be damaged by high-power lasers, and the attenuation device can properly attenuate the power density of measuring beams to meet the range ability of optical measuring elements. An ideal attenuation device is not related to the wavelength, incident angle and polarization state of the incident lasers, but only attenuates the amplitude of the incident lasers, and attenuation is linear within a certain range.

As a technical scheme, an optical beam splitter and a monitoring device are provided, the optical beam splitter is arranged on an optical path of the emergent light of the reference light sources, and the monitoring device is used for measuring monitoring beams split by the optical beam splitter.

1—integrating sphere; 2—broadband photodetector; 3—incident window; 4-1—LED light source; 4-2—laser device; 5—attenuation device; 6—light diffusion device; 7—spectral measurement window; 8—spectral radiometer; 9—calibration detector; 10—incident diaphragm; 11—baffle; 12—optical beam splitter; 13—monitoring device.

DETAILED DESCRIPTION OF THE INVENTION

Embodiment 1

Figure 1:
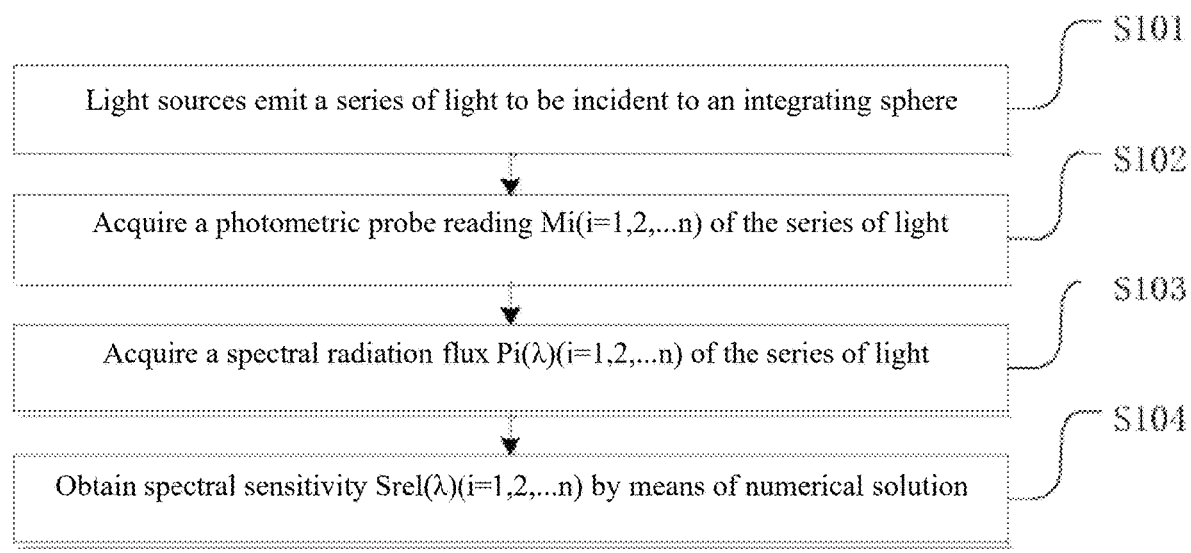
FIG. 1 is a flowchart of an integrating sphere photometer spectral response measurement method according to an embodiment of the invention.
Figure 2:
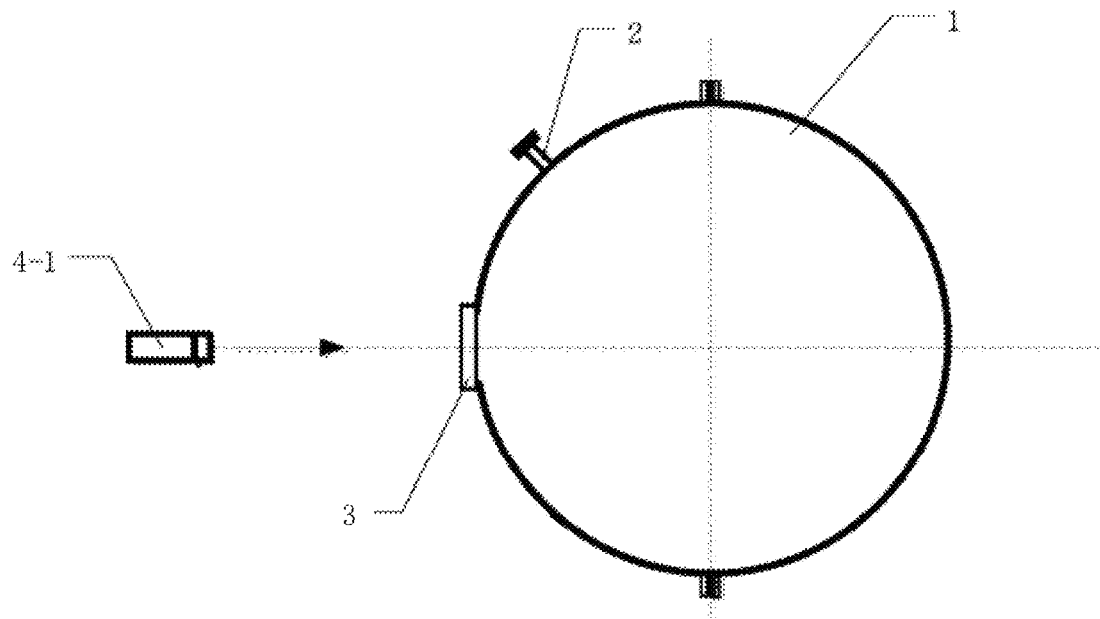
FIG. 2 is a structural diagram of an integrating sphere photometer spectral response measurement system using LED light sources according to an embodiment of the invention.

An embodiment of an integrating sphere photometer spectral response measurement system provided by the invention, as shown in FIGS. 1 and 2, comprises an LED light source 4-1 and an integrating sphere 1, a broadband photodetector 2 is arranged on the sphere wall of the integrating sphere 1, an incident window 3 is also arranged on the integrating sphere 1, and the LED light source 4-1 can emit light of three or more specified bands in sequence.

An integrating sphere photometer spectral response measurement method comprises the following steps:

(1) an LED light source 4-1 emits light with three or more specified bands and overlapping spectra;
(2) the spectral radiation flux $P_i(\lambda)(i=1, 2, \ldots n)$ of the light emitted from the LED light source 4-1 is obtained in advance;
(3) the light emitted by the LED light source 4-1 sequentially is incident to the integrating sphere 1 through the incident window 3;
(4) the photometric value $M_i(i=1, 2, \ldots n)$ of mixed light in the integrating sphere is obtained through the broadband photodetector 2; and
(5) according to the photometric value $M_i$ and spectral radiation flux $P_i(\lambda)$ of the light emitted by the LED light source 4-1, the spectral responsivity $S_{rel}(\lambda)(i=1, 2, \ldots n)$ of the integrating sphere photometer is obtained by means of numerical solution:

$$\begin{cases} \int_{\lambda_1}^{\lambda_2} P_1(\lambda) \cdot S_{rel}(\lambda) = M_1 \\ \quad \vdots \\ \int_{\lambda_{2n-1}}^{\lambda_{2n}} P_n(\lambda) \cdot S_{rel}(\lambda) = M_n \end{cases}$$

Embodiment 2

Figure 3:
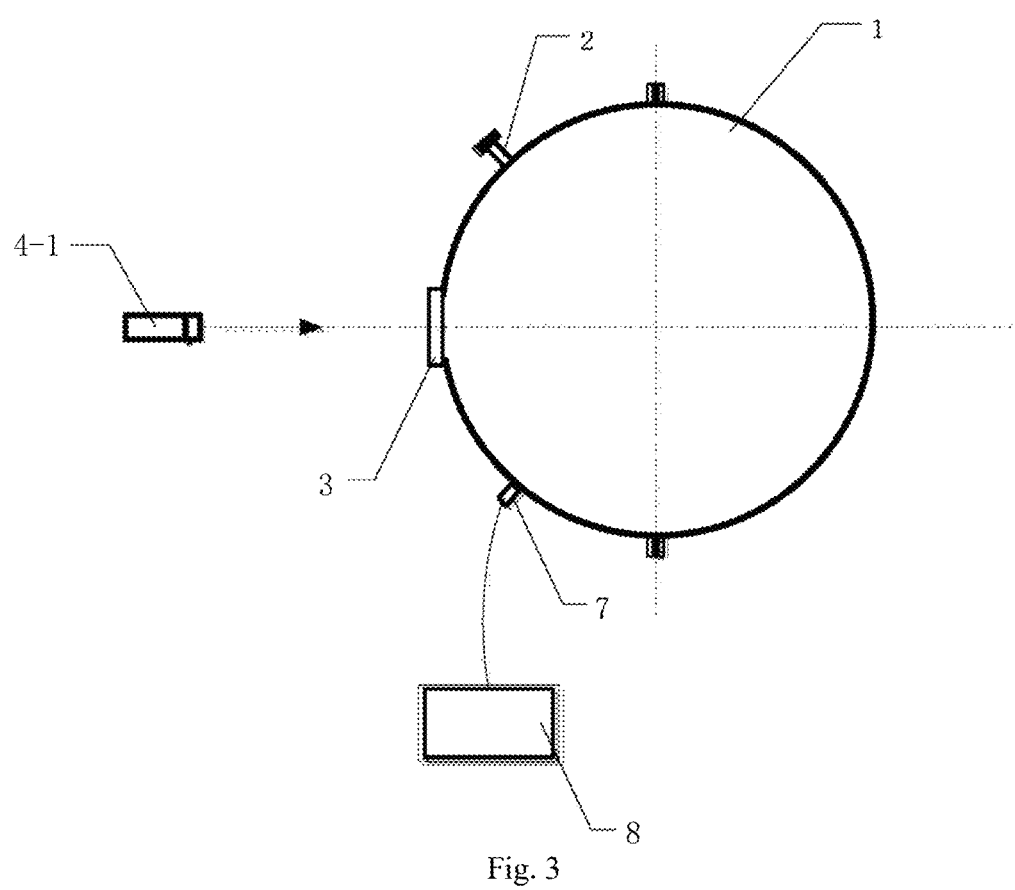
FIG. 3 is a structural diagram of an integrating sphere photometer spectral response measurement system using LED area light sources according to an embodiment of the invention.

An embodiment of an integrating sphere photometer spectral response measurement system provided by the invention is shown in FIGS. 1 and 3. Compared with Embodiment 1, a spectral measurement window 7 and a spectral radiometer 8 are added, the spectral measurement window 7 is arranged on the sphere wall of the integrating sphere 1, and a receiving end of the spectral radiometer 8 is arranged on the spectral measurement window 7.

An integrating sphere photometer spectral response measurement method comprises the following steps:

(1) an LED light source 4-1 emits light with three or more specified bands and overlapping spectra;
(2) the light emitted by the light source module 4-1 sequentially is incident to the integrating sphere 1;
(3) the photometric value $M_i(i=1, 2, \ldots n)$ of mixed light in the integrating sphere 1 is obtained through the broadband photodetector 2;
(4) the spectral radiation flux $P_i(\lambda)(i=1, 2, \ldots n)$ of the light emitted from the LED light source 4-1 is obtained through the spectral radiometer 8; and
(5) according to the photometric value $M_i$ and spectral radiation flux $P_i(\lambda)$ of the light emitted by the LED light source 4-1, the spectral responsivity $S_{rel}(\lambda)(i=1, 2, \ldots n)$ of the integrating sphere photometer is obtained by means of numerical solution:

$$\begin{cases} \int_{\lambda_1}^{\lambda_2} P_1(\lambda) \cdot S_{rel}(\lambda) = M_1 \\ \quad \vdots \\ \int_{\lambda_{2n-1}}^{\lambda_{2n}} P_n(\lambda) \cdot S_{rel}(\lambda) = M_n \end{cases}$$

Embodiment 3

Figure 4:
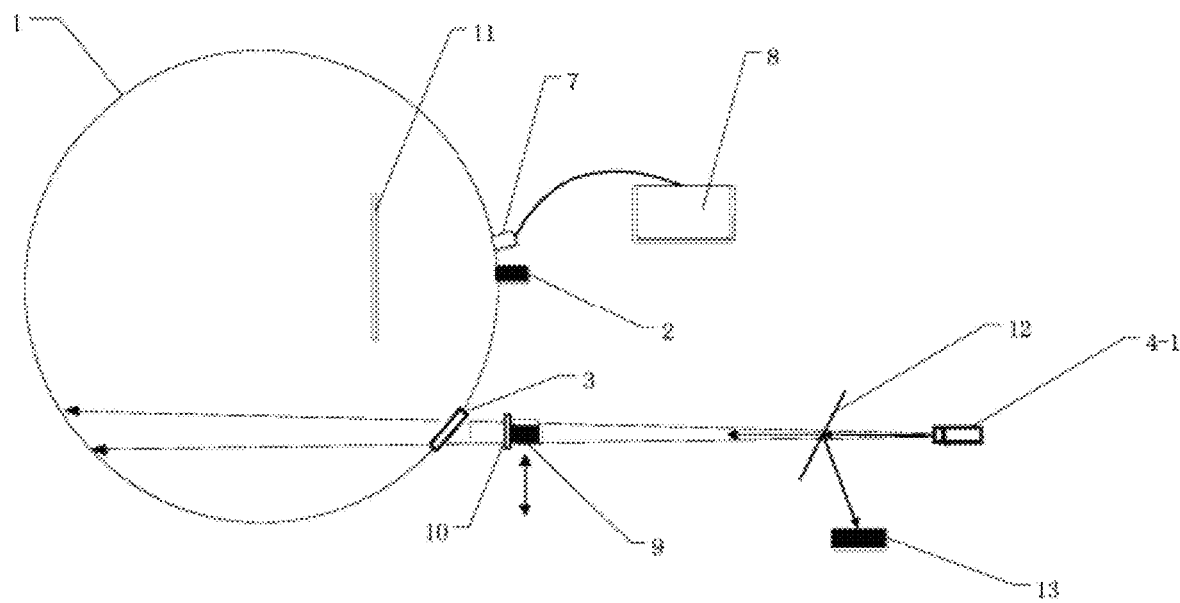
FIG. 4 is a structural diagram of an integrating sphere photometer spectral response measurement system using a laser device according to an embodiment of the invention.

An embodiment of an integrating sphere photometer spectral response measurement system provided by the invention is shown in FIGS. 1 and 4. Compared with Embodiment 2, an incident diaphragm 10 and a calibration detector 9 are added. The incident diaphragm 10 is arranged outside the incident window 3 of the integrating sphere 1, and the calibration detector 9 can be connected to and disconnected from an optical path, and is arranged on a diaphragm port of the incident diaphragm 10 to obtain the radiation illuminance value of the light incident to the integrating sphere 1. Further, a baffle 11 is arranged in the integrating sphere 1, an optical beam splitter 12 is arranged in front of the LED light source 4-1, and a monitoring device 13 is used for measuring monitoring beams split by the optical beam splitter 12.

An integrating sphere photometer spectral response measurement method comprises the following steps:

(1) the LED light source 4-1 adopts various monochromatic LEDs as reference light sources, and emits light with three or more specified bands and overlapping spectra;
(2) the light emitted from the LED light source 4-1 sequentially is divided into measuring beams and monitoring beams through the optical beam splitter 12, the monitoring device 13 measures the monitoring beams, and the measuring beams are incident to the integrating sphere 1;
(3) the photometric value $M_i(i=1, 2, \ldots n)$ of mixed light in the integrating sphere is obtained through the broadband photodetector 2;

(4) the relative spectral radiation flux of the light emitted from the LED light source 4-1 is obtained through the spectral radiometer 8;

(5) the absolute spectral radiation flux $P_i(i=1, 2, \ldots n)=E_j \cdot A$ of the light incident to the integrating sphere by the LED light source 4-1 is calculated based on the irradiance $E_j$ obtained by the calibration detector 9 and the area A of the incident diaphragm 10, and the relative spectral radiation flux value obtained by the spectral radiometer 8 is calibrated to obtain the total spectral radiation flux $P_i(\lambda)(i=1, 2, \ldots n)$ received by the integrating sphere photometer system; and (6) according to the photometric value $M_i$ and the calibrated total spectral radiation flux $P_i(\lambda)(i=1, 2, \ldots n)$ of the light emitted by the LED light source 4-1, the spectral responsivity $S_{rel}(\lambda)(i=1, 2, \ldots n)$ of the integrating sphere photometer is obtained by means of numerical solution:

$$\begin{cases} \int_{\lambda_1}^{\lambda_2} P_1(\lambda) \cdot S_{rel}(\lambda) = M_1 \\ \quad\quad \vdots \\ \int_{\lambda_{2n-1}}^{\lambda_{2n}} P_n(\lambda) \cdot S_{rel}(\lambda) = M_n \end{cases}$$

Embodiment 4

Figure 5:
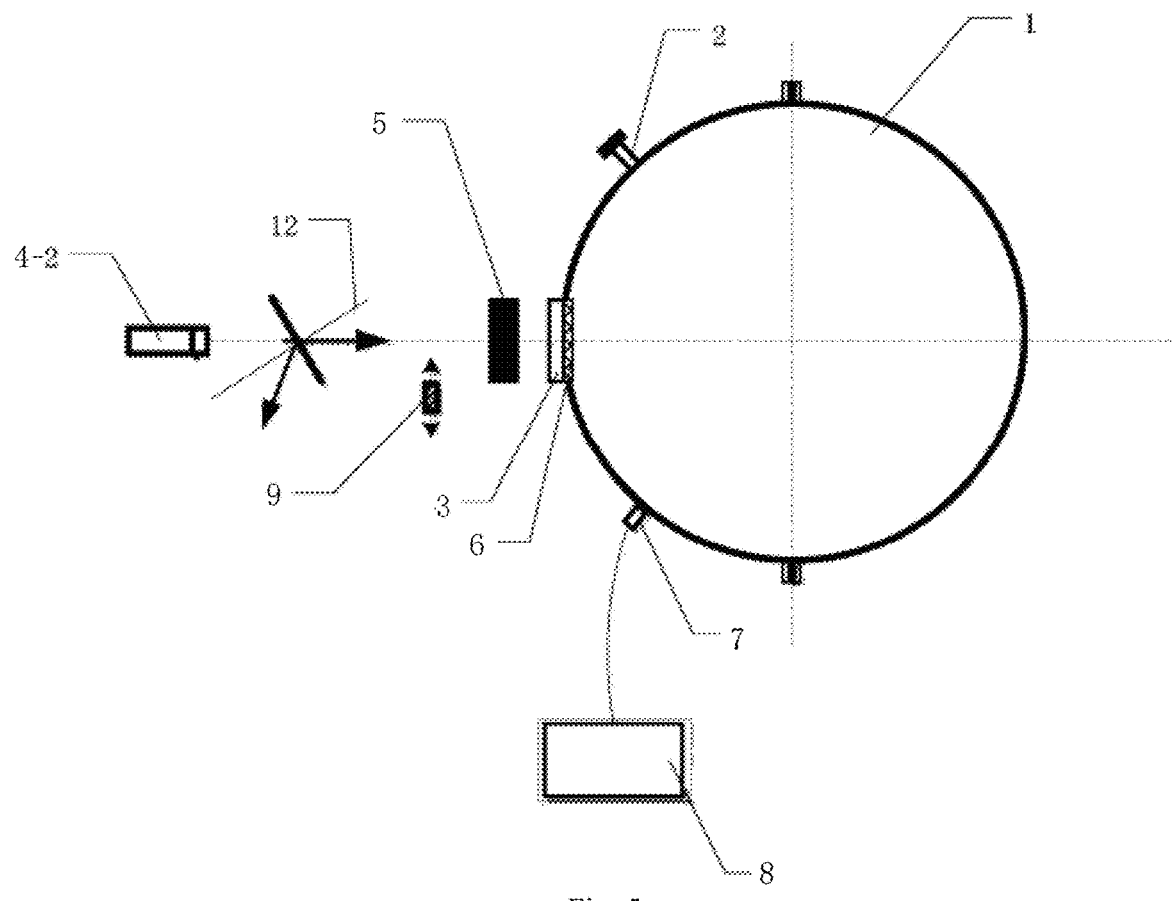
FIG. 5 is a structural diagram of an integrating sphere photometer spectral response measurement system using a laser device, an attenuation device and a light diffusion device according to an embodiment of the invention.

An embodiment of an integrating sphere photometer spectral response measurement system provided by the invention is shown in FIGS. 1 and 5. Compared with Embodiment 1, the reference light source is a laser device 4-2, and an attenuation device 5 and a light diffusion device 6 are added.

An integrating sphere photometer spectral response measurement method comprises the following steps:

(1) the laser device 4-2 emits lasers with a characteristic wavelength;

(2) the spectral power flux $P_i(\lambda)(i=1, 2, \ldots n)$ of the light emitted by the laser device 4-2 is obtained in advance;

(3) the lasers emitted by the laser device 4-2 pass through the attenuation device 5 and are incident to the integrating sphere 1, and the power density of the lasers is reduced through the light diffusion device 6;

(4) the photometric value $M_i(i=1, 2, \ldots n)$ of light in the integrating sphere is obtained through the broadband photodetector 2; and (5) according to the photometric value $M_i$ and spectral radiation flux $P_i(\lambda)$ of the light emitted by the laser device 4-2, the spectral responsivity $S_{rel}(\lambda)(i=1, 2, \ldots n)$ of the integrating sphere photometer is obtained by means of numerical solution:

$$\begin{cases} \int_{\lambda_1}^{\lambda_2} P_1(\lambda) \cdot S_{rel}(\lambda) = M_1 \\ \quad\quad \vdots \\ \int_{\lambda_{2n-1}}^{\lambda_{2n}} P_n(\lambda) \cdot S_{rel}(\lambda) = M_n \end{cases}$$

The specific embodiments of the invention have been described above with reference to the attached drawings, but it should be understood by those skilled in the art that the above embodiments are only for illustration, and are not intended to limit the scope of the invention. It should be understood by those skilled in the art that the above embodiments can be modified without departing from the scope and spirit of the invention. The scope of protection of the invention is defined by the appended Claims.

What is claimed is:

1. An integrating sphere photometer spectral response measurement method, involving an integrating sphere photometer consisting of an integrating sphere and a broadband photodetector, the broadband photodetector being mounted on a sphere wall of the integrating sphere, wherein the integrating sphere photometer is used for measuring three or more reference light sources with different peak wavelengths, wherein at least one of the three or more reference light sources is an LED light source, and the LED light source consists of monochromatic LEDs and/or white LEDs with overlapping spectra, and a spectral responsivity of the integrating sphere photometer is calculated according to a spectral radiation flux of the reference light sources and the response of the integrating sphere photometer to the reference light sources; the method comprising:

Step a, emitting light of the three or more reference light sources with different peak wavelengths to be incident to the integrating sphere, and reading the response $M_i(i=1, 2, \ldots n)$ of the integrating sphere photometer, where n is the number of the reference light sources;

Step b, acquiring the spectral radiation flux $P_i(\lambda)(i=1, 2, \ldots n)$ of the reference light sources incident to the integrating sphere;

Step c, establishing the following equation, where $S_{rel}(\lambda)$ is the spectral responsivity of the integrating sphere photometer, $$\begin{cases} \int_{\lambda_1}^{\lambda_2} P_1(\lambda) \cdot S_{rel}(\lambda) = M_1 \\ \quad\quad \vdots \\ \int_{\lambda_{2n-1}}^{\lambda_{2n}} P_n(\lambda) \cdot S_{rel}(\lambda) = M_n \end{cases};$$

Step d, obtaining the spectral responsivity $S_{rel}(\lambda)$ of the integrating sphere photometer by means of numerical solution.

2. The integrating sphere photometer spectral response measurement method according to claim 1, wherein the spectral radiation flux $P_i(\lambda)$ is an absolute value, or the spectral radiation flux $P_i(\lambda)$ is a relative value.

3. The integrating sphere photometer spectral response measurement method according to claim 1, wherein the incident light of the reference light sources enters the integrating sphere through an incident window on the sphere wall of the integrating sphere, and an incident diaphragm is provided with a calibration detector capable of being connected to and disconnected from an optical path, so as to obtain the radiation flux of the reference light sources.

4. The integrating sphere photometer spectral response measurement method according to claim 1, wherein a measurement window connected with a calibrated spectral radiometer is arranged on the sphere wall of the integrating sphere to obtain the spectral radiation flux of the reference light sources.

5. The integrating sphere photometer spectral response measurement method according to claim 1, wherein at least one of the reference light sources is an adjustable light source with a uniform light-emitting surface, and the light-emitting surface of the at least one of the reference light sources is provided with a detachable spectral radiometer.

6. An integrating sphere photometer spectral response measurement system, comprising:

an integrating sphere photometer and three or more reference light sources with different peak wavelengths, wherein at least one of the three or more reference light sources is an LED light source, and the LED light source consists of monochromatic LEDs and/or white LEDs with overlapping spectra, wherein the integrating sphere photometer consists of an integrating sphere and a broadband photodetector, the broadband photodetector is mounted on a sphere wall of the integrating sphere, an incident window is arranged on the integrating sphere, and the emergent light of the reference light sources is incident to the integrating sphere through the incident window.

7. The integrating sphere photometer spectral response measurement system according to claim 6, further comprising an incident diaphragm and a calibration detector, wherein the incident diaphragm is arranged outside the incident window of the integrating sphere, and the calibration detector is arranged on a diaphragm port of the incident diaphragm and capable of being connected to and disconnected from an optical path.

8. The integrating sphere photometer spectral response measurement system according to claim 6, comprising a spectral measurement window and a spectral radiometer, wherein the spectral measurement window is arranged on the sphere wall of the integrating sphere, and the spectral radiometer is connected with the spectral measurement window.

9. The integrating sphere photometer spectral response measurement system according to claim 6, wherein a light diffusion device is arranged in the integrating sphere, and a baffle is arranged in the integrating sphere.

10. The integrating sphere photometer spectral response measurement system according to claim 6, wherein an attenuation device is arranged outside the incident window.

11. The integrating sphere photometer spectral response measurement system according to claim 6, comprising an optical beam splitter and a monitoring device, wherein the optical beam splitter is arranged on an optical path of the emergent light of the reference light sources, and the monitoring device is used for measuring monitoring beams split by the optical beam splitter.

\* \* \* \* \*